United States Patent [19]

Whittaker

[11] 4,070,031
[45] Jan. 24, 1978

[54] STEERING LINKAGES

[76] Inventor: Donald George MacLeod Whittaker, Silver Creek,, Union Mills, Isle of Man

[21] Appl. No.: 673,431

[22] Filed: Apr. 5, 1976

[30] Foreign Application Priority Data

May 13, 1975 United Kingdom ............... 20070/75

[51] Int. Cl.² .................... B62D 7/00; A01B 69/08
[52] U.S. Cl. ..................................... 280/103; 172/282; 280/444
[58] Field of Search ............... 280/103, 98, 99, 80 R, 280/442, 444, 81.5, 86, 96; 172/282, 284, 285, 244

[56] References Cited

U.S. PATENT DOCUMENTS

| 1,708,297 | 4/1929 | Hansmann et al. | 172/284 X |
| 1,740,321 | 12/1929 | Vasconcellos | 280/444 X |
| 3,625,294 | 12/1971 | Morkoski | 172/282 |
| 3,830,312 | 8/1974 | Brandly | 172/282 |
| 3,920,261 | 11/1975 | Ellingsen et al. | 280/81.5 X |

Primary Examiner—Joseph F. Peters, Jr.
Assistant Examiner—Donn McGiehan
Attorney, Agent, or Firm—Fleit & Jacobson

[57] ABSTRACT

A steering linkage for a wheeled trailer vehicle or implement comprising a frame, in which a bar is slidably mounted in a transverse frame member, the said bar having a rack formed thereon and in mesh with a pinion rotatble by a steering, or link, rod to impart sliding motion to the bar in response to movement of the steering rod, the bar being linked to steerable wheels of the vehicle or implement.

4 Claims, 1 Drawing Figure

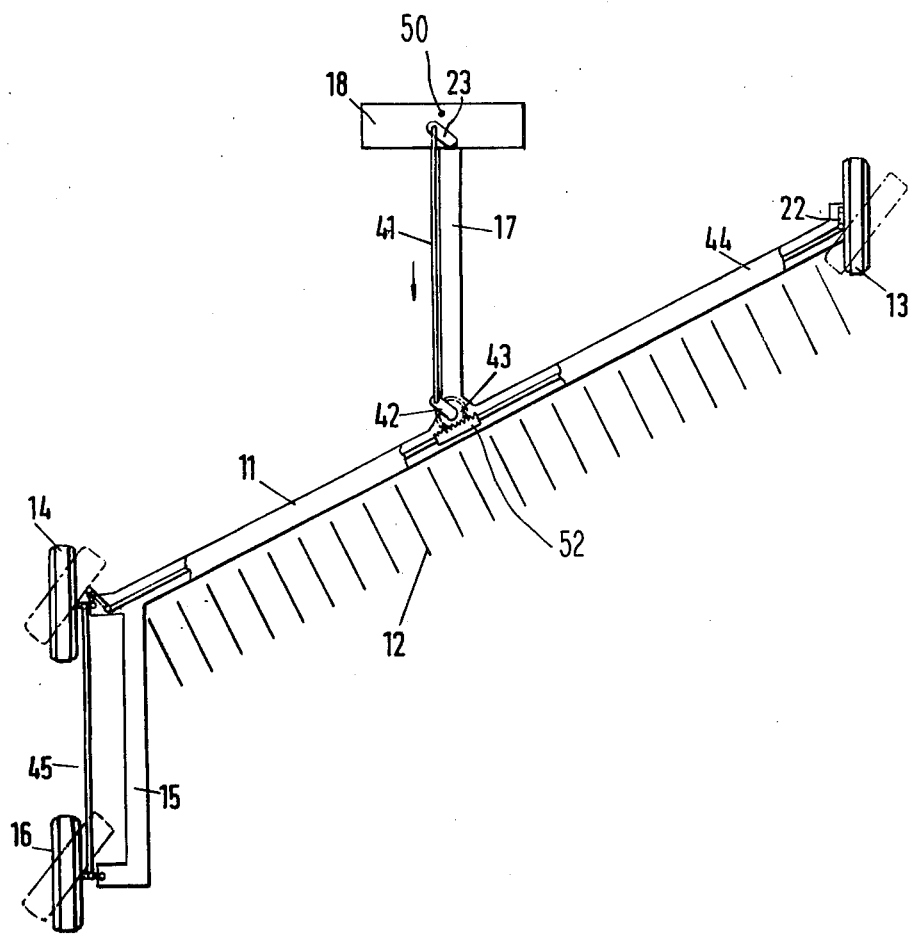

STEERING LINKAGES

SUMMARY OF THE INVENTION

This invention relates to steering linkages for agricultural implements or wheeled trailer vehicles.

The invention consists in a steering linkage for a wheeled trailer vehicle or implement comprising a frame, in which a bar is slidably mounted in a transverse frame member, the said bar having a rack formed thereon and in mesh with a pinion rotatable by a steering, or link, rod to impart sliding motion to the bar in response to movement of the steering, or link, rod, the bar being linked to steerable wheels of the vehicle or implement.

BRIEF DESCRIPTION OF THE DRAWINGS

The accompanying drawing is a diagrammatic plan view of a discer incorporating a steering linkage according to a preferred form of the invention.

DETAILED DESCRIPTION OF THE DRAWING

The drawing shows a discer with a frame comprising a transverse frame member 11 to which discs 12 are attached. Steerable wheels 13 and 14 are attached to the ends of the frame member 11 and a rearward frame extension 15 has a further steerable wheel 16 attached thereto.

The wheel 16 is provided with a steel tire with a very pronounced center rim which penetrates into the ground to ensure positive steering.

A forwardly extending frame member 17 extends from about the centre of the frame 11 and is pivotally connected at point 50 by conventional apparatus to a cross member 18 adapted to extend between the lower links of a conventional three-point tractor hitch. Adjustment of the height of the links enables the depth of operation of the discs 12 to be controlled, and also enables the discs 12 and the wheels 13 and 14 to be raised clear of the ground for transport.

Fixed relative to the cross member 18 is an arm 23 to which is attached the forward end of a steering, or link, rod 41. The rearward end of the rod is pivoted to an arm 42 drivably connected to a pinion 43 mounted in the frame member 11. A bar 44 slidably mounted in frame member 11 has a rack portion 52 cooperable with a pinion 43 so that movement of the link rod 41 relative to the discer causes sliding movement of the bar 44 in the frame member 11. The bar 44 acts as a steering link for the wheels 13 and 14, and an extension link 45 steers the wheel 16 conjointly with the wheel 14. The bar 44 is connected to the wheel 13 by a link 22 and, since the wheel 13 and the bar 44 are both mounted on the frame, some lost motion must be provided, either by making the link telescopic or by using a slotted connection. Connection to the wheel 14 is by a pair of links.

Various modifications may be made within the scope of the invention. For instance, in some forms of implement, the wheel 16, and its steering linkage and the extension 15 may be omitted. Also, the angle between the frame members 11 and 17 may be varied within wide limits.

I claim:

1. In a steering linkage for a trailer vehicle or implement comprising a frame and steerable wheels mounted on the frame wherein the improvement comprises a transverse frame member, a bar slidably mounted in the said transverse frame member, a rack formed on the said bar, a pinion rotatably mounted in the transverse frame member in mesh with the said rack, means for rotating said pinion comprising a link rod, said link rod interconnected with said pinion, the rotation of the pinion imparting sliding motion to the bar, and means for linking the bar and the steerable wheels whereby sliding motion of the bar provides rotary motion to the steerable wheels, a forwardly extending frame member, means for connecting said forwardly extending frame member to said transverse frame at the mid-point of said transverse frame, a cross-member adapted to be connected to a trailer hitch, and means for pivotally connecting said forwardly extending frame member to said crossmember.

2. The improvement as claimed in claim 1, further comprising means for interconnecting said link rod to said cross-member comprising an arm fixedly connected to said cross-member at one end of said arm, and pivotably connected to said link rod at the other end of said arm.

3. The improvement as claimed in claim 2, wherein said link rod is interconnected with said pinion by an additional arm, said additional arm pivotally mounted to said link rod at one end of said additional arm, and fixedly connected to said additional pinion at the other end of said arm.

4. The improvement as claimed in claim 3, further comprising an extending frame rearwardly extending from one end of said transverse frame, a steerable wheel mounted on said extending frame, and means for linking said steerable wheel on said extending frame to said bar.

* * * * *